US010645587B2

(12) United States Patent
Mathison et al.

(10) Patent No.: US 10,645,587 B2
(45) Date of Patent: *May 5, 2020

(54) DYNAMIC NETWORK SLICE RESOLUTION

(71) Applicant: Verizon Patent and Licensing Inc., Arlington, VA (US)

(72) Inventors: James Mathison, Warren, NJ (US); Niranjan B. Avula, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,587

(22) Filed: Oct. 25, 2019

(65) Prior Publication Data
US 2020/0059792 A1 Feb. 20, 2020

Related U.S. Application Data

(63) Continuation of application No. 16/426,283, filed on May 30, 2019, now Pat. No. 10,484,874, which is a continuation of application No. 15/699,390, filed on Sep. 8, 2017, now Pat. No. 10,341,872.

(51) Int. Cl.
| | |
|---|---|
| *H04W 16/10* | (2009.01) |
| *H04W 8/20* | (2009.01) |
| *H04W 8/08* | (2009.01) |
| *H04W 88/08* | (2009.01) |
| *H04W 60/04* | (2009.01) |
| *H04W 8/18* | (2009.01) |
| *H04W 88/02* | (2009.01) |

(52) U.S. Cl.
CPC ............ *H04W 16/10* (2013.01); *H04W 8/08* (2013.01); *H04W 8/18* (2013.01); *H04W 8/20* (2013.01); *H04W 8/186* (2013.01); *H04W 60/04* (2013.01); *H04W 88/02* (2013.01); *H04W 88/08* (2013.01)

(58) Field of Classification Search
CPC ............ H04W 8/08; H04W 8/18; H04W 8/20; H04W 8/186; H04W 16/10; H04W 60/04; H04W 88/02; H04W 88/08
USPC .......................................................... 370/328
See application file for complete search history.

(56) References Cited

U.S. PATENT DOCUMENTS

| | | | |
|---|---|---|---|
| 2016/0373183 A1* | 12/2016 | Yi ........................ | H04W 76/14 |
| 2017/0142591 A1* | 5/2017 | Vrzic ................... | H04W 24/08 |
| 2017/0289791 A1* | 10/2017 | Yoo ...................... | H04W 60/04 |

(Continued)

*Primary Examiner* — William Nealon

(57) ABSTRACT

A first device can receive an attach request that includes information associated with a user device. The user device can provide the attach request to request access to a network. The first device can provide, to a second device and using the information associated with the user device, a request for information associated with a group identifier that is associated with the user device. The first device can receive, from the second device, the information associated with the group identifier that is associated with the user device based on providing the request for information associated with the group identifier. The first device can determine a network slice identifier that is associated with the user device based on the information associated with the group identifier that is associated with the user device. The first device can permit the user device to access a network slice, of the network, that is associated with the network slice identifier based on determining the network slice identifier.

20 Claims, 6 Drawing Sheets

(56) References Cited

U.S. PATENT DOCUMENTS

2017/0332421 A1* 11/2017 Sternberg .............. H04W 76/11
2018/0054765 A1*  2/2018 Kim ....................... H04W 4/70
2018/0302877 A1* 10/2018 Bosch ................... H04W 68/02

* cited by examiner

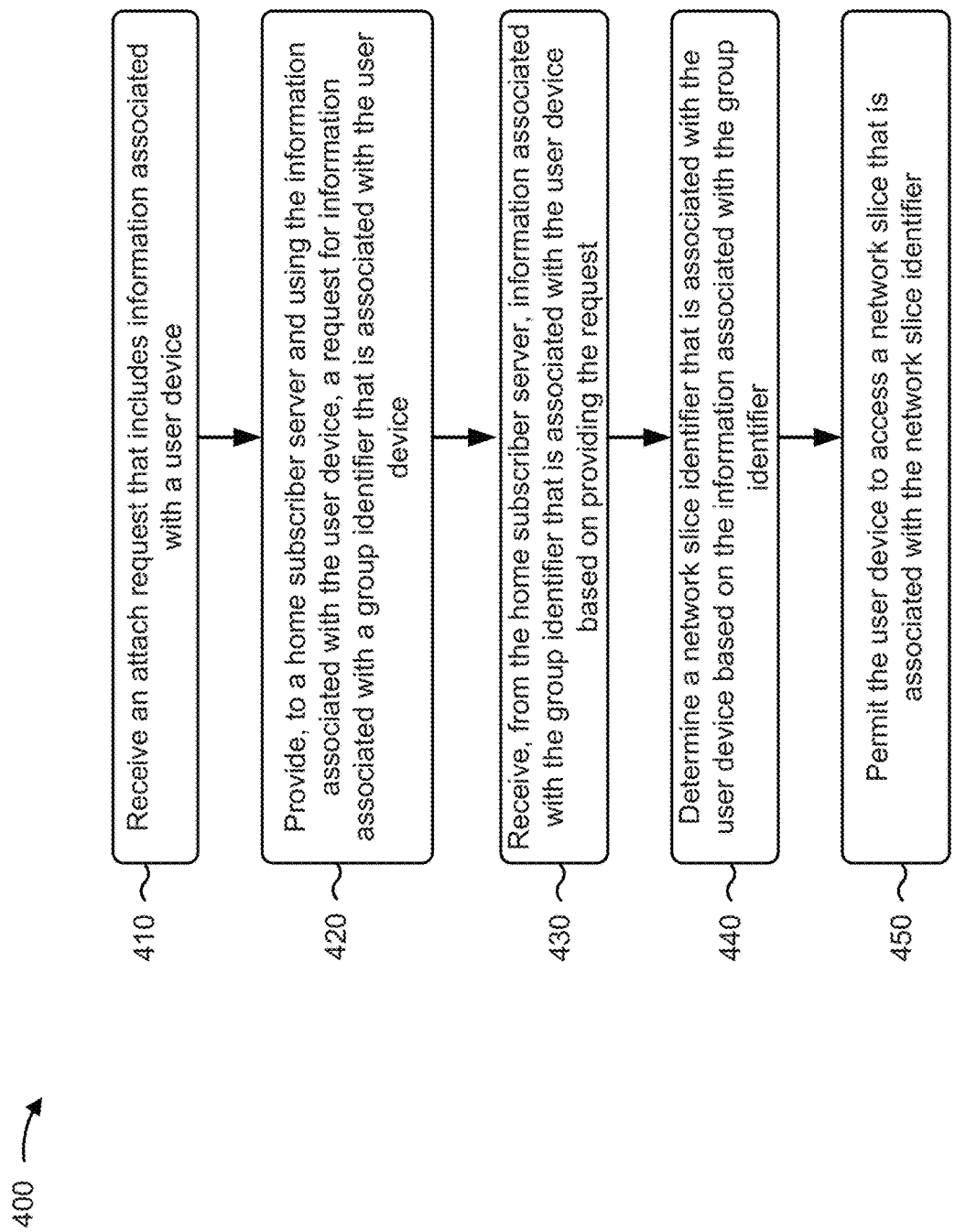

DYNAMIC NETWORK SLICE RESOLUTION

RELATED APPLICATIONS

This application is a continuation of U.S. patent application Ser. No. 16/426,283, filed May 30, 2019, which is a continuation of U.S. patent application Ser. No. 15/699,390, filed Sep. 8, 2017 (now U.S. Pat. No. 10,341,872), the contents of which are incorporated herein by reference in their entireties.

BACKGROUND

Network slicing refers to the partitioning of the same physical infrastructure to support different service requirements via different network slices. For example, each network slice might have separate traffic on the user plane and the control plane, such that user traffic and control traffic on a first network slice does not interfere with user traffic and control traffic on a second network slice. In this way, a network slice operates as a virtual network with dedicated resources (e.g., which can be adjusted dynamically) partitioned from the total resources allocated to a base station.

BRIEF DESCRIPTION OF THE DRAWINGS

FIG. 4 is a flow chart of an example process for performing dynamic network slice resolution.

DETAILED DESCRIPTION OF PREFERRED EMBODIMENTS

Figure 1A:
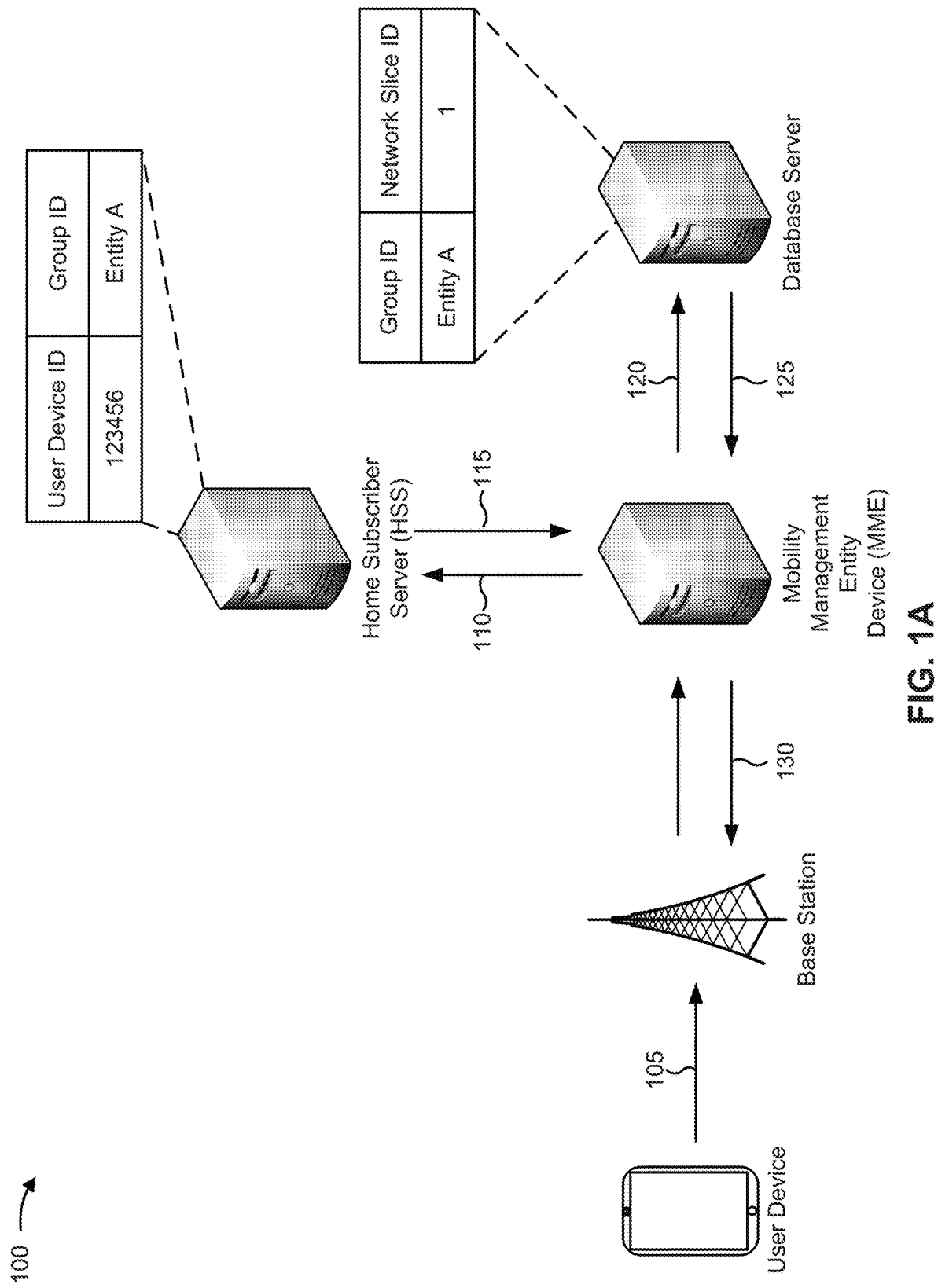
FIGS. 1A-1C are diagrams of an overview of an example implementation described herein.

The following detailed description of example implementations refers to the accompanying drawings. The same reference numbers in different drawings can identify the same or similar elements.

Network functions virtualization (NFV) permits different network slices to be allocated resources to handle different service requirements associated with different types of user devices (e.g., user equipment (UEs), Internet-of-things (IoT) devices, and/or the like) and/or different applications executing on user devices. For example, different network slices might be capable of supporting different service requirements, such as service requirements associated with different quality of service (QoS) levels, service requirements associated with different QoS class identifier (QCI) values, service requirements associated with different categories of user devices, different combinations of QoS parameters (e.g., a latency requirement, a bandwidth requirement, a jitter requirement, an error requirement, a reliability requirement, a throughput requirement, and/or the like), and/or the like.

As an example, a user device categorized as a smart phone can connect to a network slice associated with mobile broadband (MBB) user devices (e.g., an "MBB network slice"). MBB user devices might be associated with service requirements that support video streaming, multimedia messaging service (MMS), voice calls and/or voice features, service continuity, charging (e.g., monitoring data usage for billing), data path optimization, and/or the like. The MBB network slice might have a different resource allocation than other network slices to support these services, such as higher bandwidth and/or throughput to support video streaming and/or the like.

As another example, a user device categorized as an IoT user device can connect to a network slice associated with IoT user devices (e.g., an "IoT network slice"). IoT user devices might be associated with service requirements that support small data optimization, battery conservation, charging (e.g., monitoring data usage for billing), and/or the like. The IoT network slice might have a different resource allocation than other network slices to support these services, such as lower bandwidth, and/or the like.

As yet another example, a user device categorized as a mobile virtual network operator (MVNO) user device might connect to a network slice associated with MVNO user devices (e.g., an "MVNO network slice"). MVNO user devices might be associated with service requirements that support a feature set of the MVNO, MBB, operator-specific charging (e.g., monitoring data usage for billing), and/or the like. The MVNO network slice might have a different resource allocation than other network slices to support these services.

In a network that employs network slicing, a network slice identifier might directly identify a particular network slice, and might be employed to control which network slice a user device is permitted to use. A network slice identifier (e.g., a numeric slice identifier) is stored in a subscriber profile in a home subscriber server (HSS), and is sent to a mobility management entity device (MME) via an S6a interface.

At attachment, a user device can request access to a particular network slice using a network slice identifier, and the MME can use the network slice identifier, that was received from the HSS, to validate that the user device is permitted to access the requested network slice. If the user device is not permitted to access the requested network slice, or did not request a particular network slice, then the MME can redirect the user device to another network slice based on the network slice identifier provided by the HSS.

Although a network slice identifier provides an unambiguous signal to the MME regarding the appropriate network slice for a particular user device, usage of network slice identifiers might not provide an efficient mechanism to move existing user devices between network slices. For example, assume that a wireless telecommunications provider desires to create a new dedicated network slice for a set of user devices (e.g., thousands, millions, etc. of user devices), or move the set of user devices from one network slice to another network slice. In this case, if the HSS stores a network slice identifier in respective subscriber profiles of subscribers associated with the set of user devices, then the HSS subscriber profile for every subscriber might need to be individually modified to move the set of user devices to the new network slice. Such an HSS bulk update is operationally intensive, and also generates a large amount of signaling traffic from the HSS to the MME to inform the MME that each individual subscriber profile has been modified.

Some implementations described herein permit the migration of a user device from one network slice to another network slice by replacing a network slice identifier in the HSS subscriber profile with a group identifier that is a symbolic representation of the network slice identifier, and enable the MME to translate the group identifier to a network slice identifier.

As an example, a wireless telecommunications provider might choose to set a group identifier in an HSS subscriber profile to a company name (e.g., "Entity A") of a company (e.g., Entity A) that is associated with a plurality of user devices. In this case, when a user device associated with Entity A attaches to the network, the MME can receive, from the HSS, information associated with the group identifier instead of directly receiving information associated with a network slice identifier, and can resolve the group identifier by consulting a database server. The database server can store mapping information that maps group identifiers and network slice identifiers. In this way, the MME can resolve the group identifier to a network slice identifier.

Accordingly, some implementations described herein permit an update to the mapping information in order to move the user devices, associated with the group identifier, to another (either new or existing) network slice. Thereafter, as user devices associated with the group identifier complete new network attachments, the user devices can move to the other network slice.

In this way, some implementations described herein enable a plurality of user devices to be moved from one network slice to another network slice without requiring the HSS to be modified for every user device of the plurality of user devices. Accordingly, implementations described herein conserve HSS and MME processor and/or memory resources, and/or conserve network resources. Furthermore, implementations described herein conserve network resources by reducing an amount of signaling traffic, from the HSS to the MME, associated with HSS subscriber profile updates.

Figure 1B:
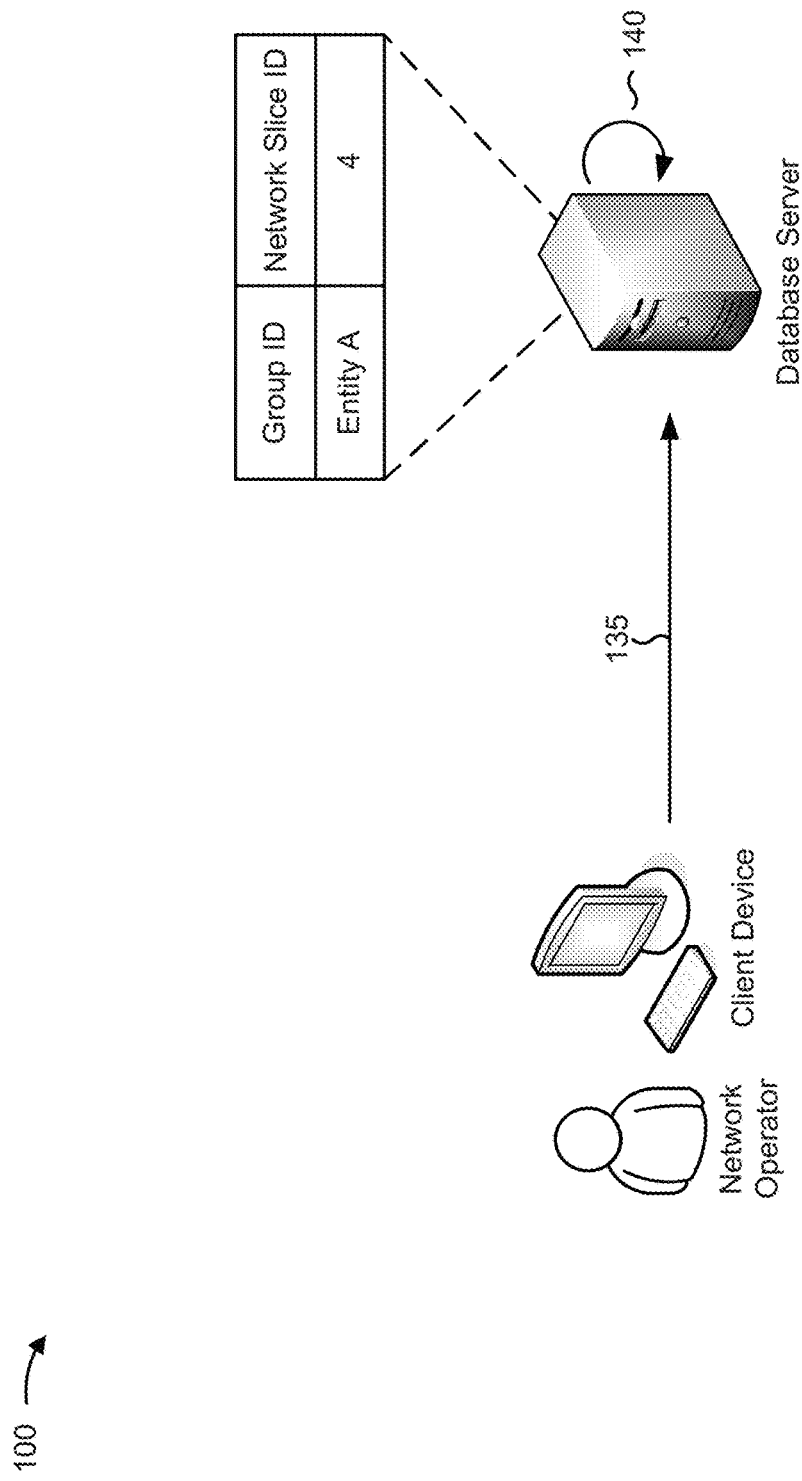
Figure 1C:
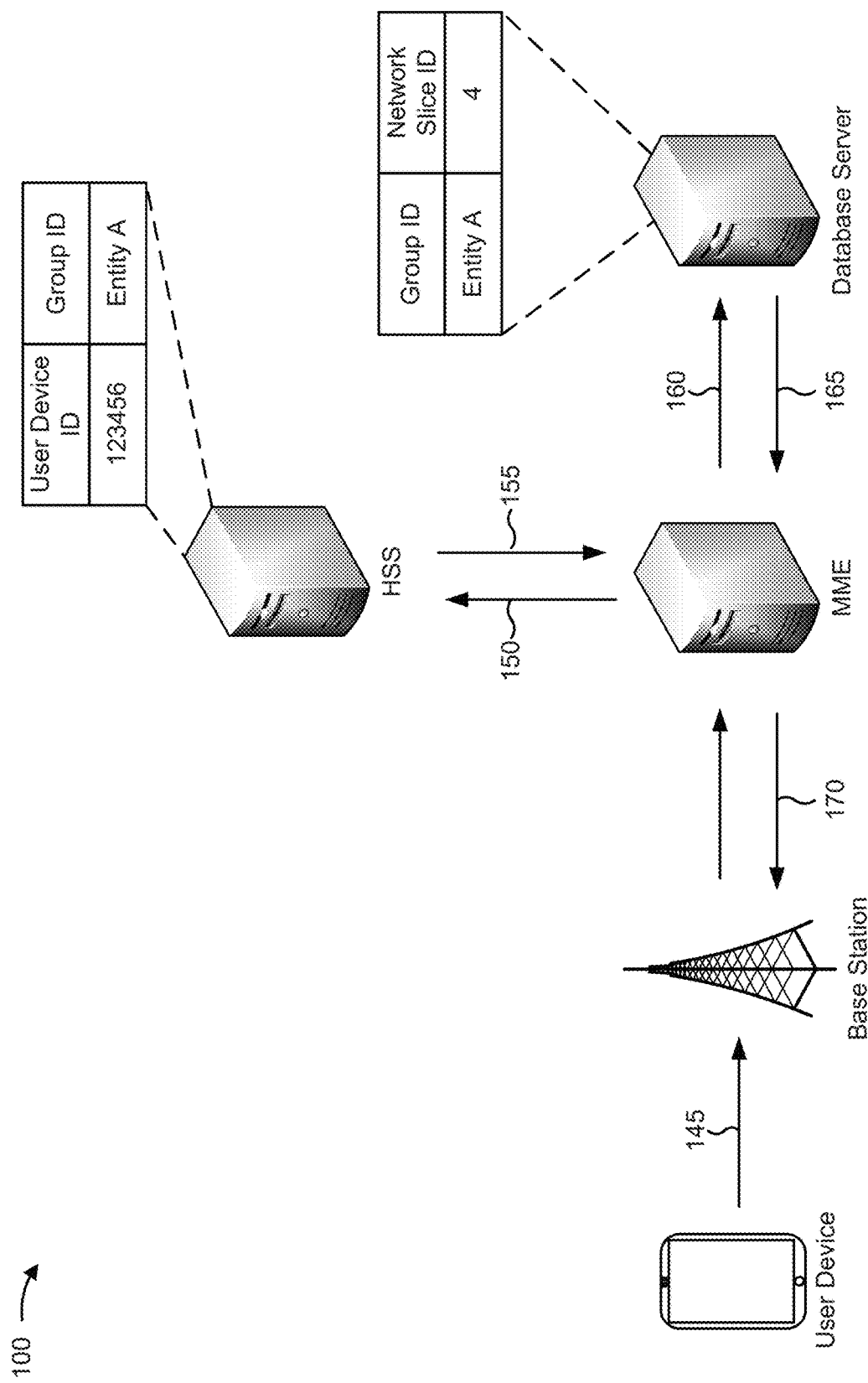

FIGS. 1A-1C are diagrams of an overview of an example implementation 100 described herein. As shown in FIG. 1A, example implementation 100 can include a user device, a base station, a mobility management entity device (MME), a home subscriber server (HSS), and a database server. As shown by reference number 105, the user device can provide, to the base station, a request for a connection with the base station. The MME can receive, from the base station and based on the request from the user device, information associated with the user device, such as a user device identifier (e.g., 123456).

As further shown in FIG. 1A, and by reference number 110, the MME can provide, to the HSS and using the information associated with the user device, a request for information associated with a group identifier associated with the user device. As shown by reference number 115, the HSS can provide, to the MME and based on the request, the information associated with the group identifier of the user device (e.g., Entity A).

As further shown in FIG. 1A, and by reference number 120, the MME can provide, to the database server and using the group identifier, a request for information associated with a network slice identifier associated with the user device. The database server can store mapping information that maps group identifiers and network slice identifiers. For example, as shown, the database server can store mapping information that maps the group identifier (e.g., Entity A) and a network slice identifier (e.g., network slice identifier 1). As shown by reference number 125, the database server can provide, to the MME, information associated with the network slice identifier.

As shown by reference number 130, the MME can, after determining the network slice identifier, permit the user device to access a network slice (e.g., network slice 1) identified by the network slice identifier. For example, the MME can provide, to the base station, an instruction for the base station to allocate resources, that are associated with the network slice, to the user device.

As shown in FIG. 1B, example implementation 100 can also include a client device operated by a network operator. As shown by reference number 135, the client device can provide, based on input from the network operator, information associated with an updated network slice identifier that is to be associated with the group identifier shown in FIG. 1A. For example, assume that the network operator desires to move user devices, that are associated with the group identifier, to a different network slice (e.g., network slice 4).

As shown by reference number 140, the database server can update mapping information, such that the updated mapping information maps the group identifier and the updated network slice identifier. For example, the database server can be updated such that the group identifier (e.g., Entity A) is mapped to network slice identifier 4 instead of being mapped to network slice identifier 1.

As shown in FIG. 1C, and by reference number 145, the user device can provide, to the base station, a request for a connection with the base station. The MME can receive, from the base station and based on the request from the user device, information associated with the user device, such as a user device identifier (e.g., 123456). As shown by reference number 150, the MME can provide, to the HSS and using information associated with the user device, a request for information associated with a group identifier associated with the user device. As shown by reference number 155, the HSS can provide, to the MME and based on the request, the information associated with the group identifier of the user device (e.g., Entity A).

As further shown in FIG. 1C, and by reference number 160, the MME can provide, to the database server and using the group identifier, a request for information associated with a network slice identifier associated with the group identifier. As shown, the database server can store mapping information (e.g., that was updated as shown in FIG. 1B) that maps the group identifier and network slice identifier 4. As shown by reference number 165, the database server can provide, to the MME, information associated with the network slice identifier.

As shown by reference number 170, the MME can, after determining the network slice identifier, permit the user device to access the network slice identified by the network slice identifier. In this case, the MME can permit the user device to access network slice 4. For example, the MME can provide, to the base station, an instruction for the base station to allocate resources, that are associated with network slice 4, to the user device.

In this way, some implementations described herein enable a plurality of user devices to be moved from one network slice to another network slice without requiring the HSS to be modified for every user device of the plurality of user devices. Accordingly, some implementations described herein conserve MME and/or HSS processor and/or memory resources relative to using a network slice identifier that is stored in the HSS. Furthermore, some implementations described herein conserve network resources by reducing an amount of signaling traffic from the HSS to the MME associated with subscriber profile modification.

As indicated above, FIGS. 1A-1C are provided merely as an example. Other examples are possible and can differ from what was described with regard to FIGS. 1A-1C.

Figure 2:
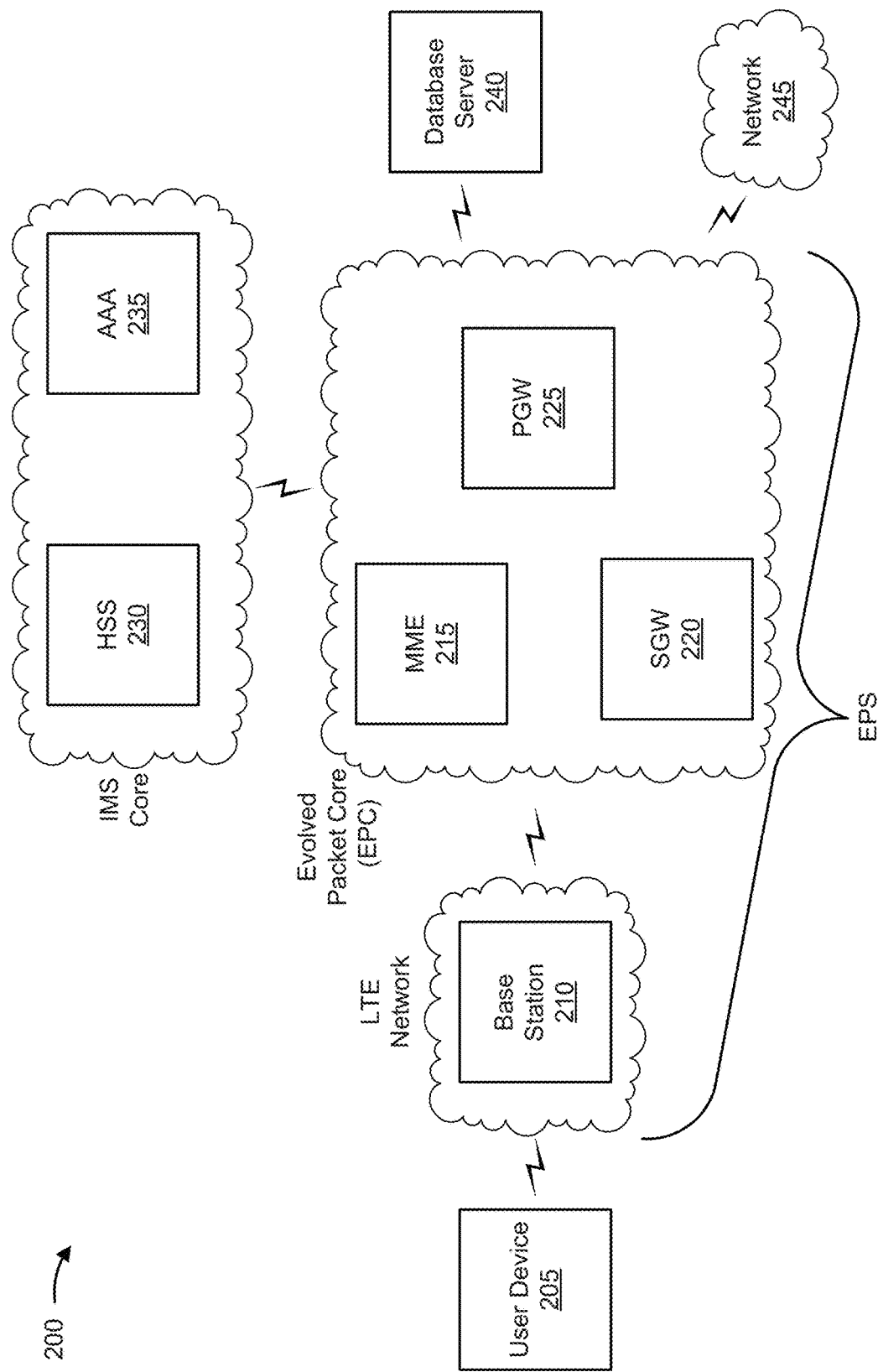
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, a base station 210, a mobility management entity device (MME) 215, a serving gateway (SGW) 220, a packet data network gateway (PGW) 225, a home subscriber server (HSS) 230, an authentication, authorization, and accounting server (AAA) 235, a database server 240, and a network 245. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a fifth generation (5G) network, a third generation (3G) network, and/or the like.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which user device 205 communicates with the EPC. The EPC can include MME 215, SGW 220, and/or PGW 225 that enable user device 205 to communicate with network 245 and/or an Internet protocol (IP) multimedia subsystem (IMS) core. The IMS core can include HSS 230 and/or AAA 235, and can manage device registration and authentication, session initiation, etc., associated with user devices 205. HSS 230 and/or AAA 235 can reside in the EPC and/or the IMS core.

User device 205 includes one or more devices capable of communicating with base station 210 and/or a network (e.g., network 245). For example, user device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. User device 205 can send traffic to and/or receive traffic from network 245 (e.g., via base station 210, SGW 220, and/or PGW 225). In some implementations, user device 205 can include medical devices and/or equipment, biometric sensors and/or devices, vehicular components and/or sensors, smart meters and/or sensors, industrial manufacturing equipment, or any other type of device that is configured to communicate via a wireless or wired medium. In other words, user device 205 can include any "thing" in the IoT.

Base station 210 includes one or more devices capable of transferring traffic, such as audio, video, text, and/or other traffic, destined for and/or received from user device 205. In some implementations, base station 210 can include an eNB associated with the LTE network that receives traffic from and/or sends traffic to network 245 via SGW 220 and/or PGW 225. Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, and/or a femtocell. In some implementations, base station 210 can include an eNB, a gNB, an access point (AP), a new radio (NR) base station 210, a fifth generation (5G) node B, and/or the like.

MME 215 includes one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 245 (e.g., via PGW 225) and/or other network devices associated with the EPC and/or the IMS core. SGW 220 can also receive traffic from network 245 and/or other network devices, and can send the received traffic to user device 205 via base station 210. Additionally, or alternatively, SGW 220 can perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 245. Additionally, or alternatively, PGW 225 can receive traffic from network 245, and can send the traffic to user device 205 via SGW 220 and base station 210. PGW 225 can record data usage information (e.g., byte usage), and can provide the data usage information to AAA 235.

HSS 230 includes one or more devices, such as one or more server devices, capable of managing (e.g., receiving, generating, storing, processing, and/or providing) information associated with user device 205. For example, HSS 230 can manage subscription information associated with user device 205, such as information associated with a subscriber profile of a user associated with user device 205, information associated with services and/or applications that are accessible to user device 205, location information associated with user device 205, a network identifier (e.g., a network address) associated with user device 205, information associated with a treatment of user device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 includes one or more devices, such as one or more server devices, that perform authentication, authorization, and/or accounting operations for communication sessions associated with user device 205. For example, AAA 235 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

Database server 240 includes one or more devices capable of receiving, processing, storing, and/or providing mapping information associated with group identifiers and network slice identifiers. For example, database server 240 can include a server device (e.g., a host server, a web server, an application server, etc.), a cloud computing device, or a similar device.

Network 245 includes one or more wired and/or wireless networks. For example, network 245 can include a cellular network (e.g., a 5G network, an NR network, an LTE network, a third generation (3G) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
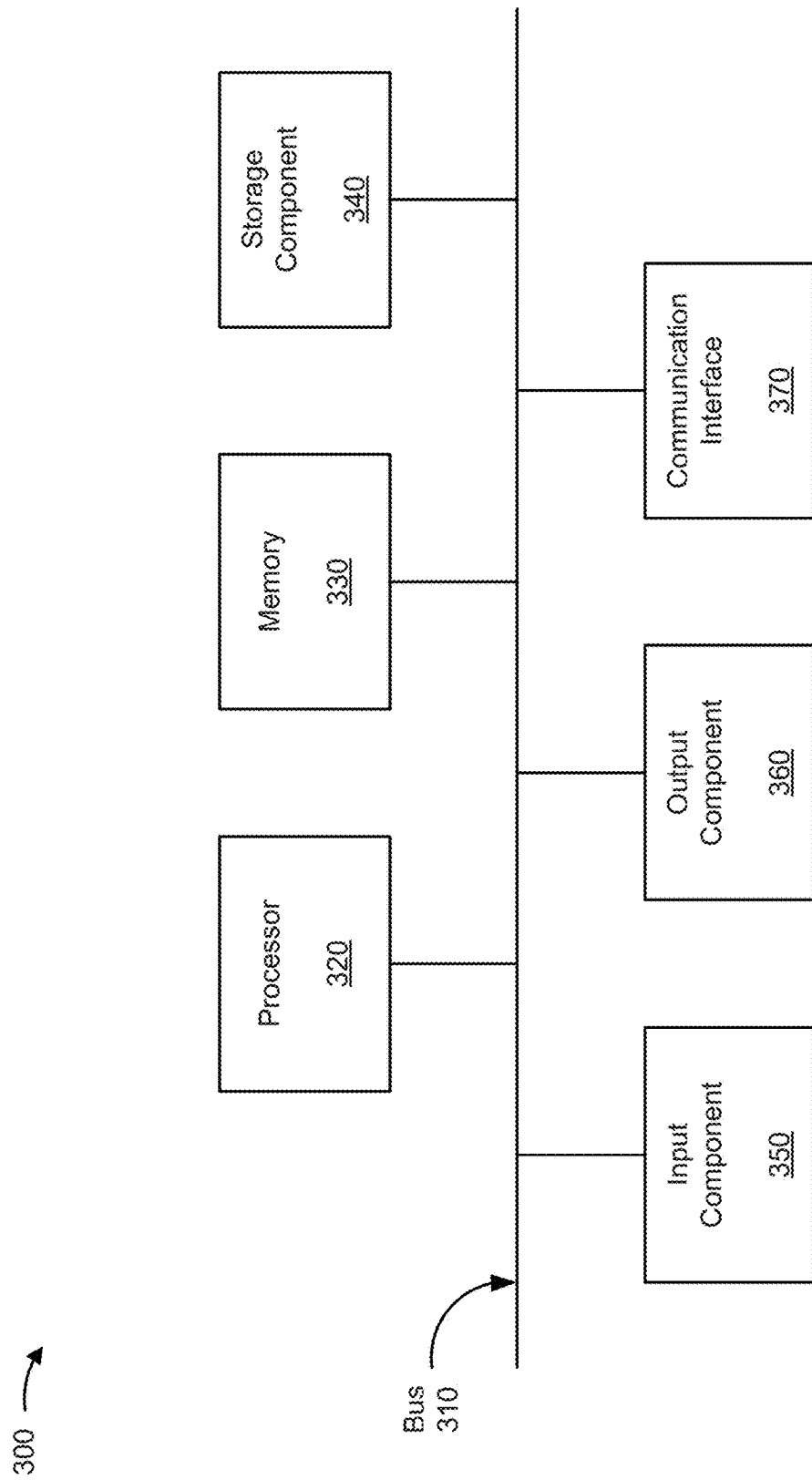
FIG. 3 is a diagram of example components of one or more devices of FIG. 2.

FIG. 3 is a diagram of example components of a device 300. Device 300 can correspond to user device 205, base station 210, MME 215, SGW 220, PGW 225, HSS 230, AAA 235, and/or database server 240. In some implementations, user device 205, base station 210, MME 215, SGW 220, PGW 225, HSS 230, AAA 235, and/or database server 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for performing dynamic network slice resolution. In some implementations, one or more process blocks of FIG. 4 can be performed by MME 215. In some implementations, one or more process blocks of FIG. 4 can be performed by another device or a group of devices separate from or including MME 215, such as user device 205, base station 210, SGW 220, PGW 225, HSS 230, and/or database server 240.

As shown in FIG. 4, process 400 can include receiving an attach request that includes information associated with a user device (block 410). For example, MME 215 can receive an attach request from user device 205 via base station 210.

In some implementations, user device 205 can provide an attach request to request a connection with base station 210. For example, user device 205 can transmit a radio resource control (RRC) connection request message to base station 210. In some implementations, MME 215 can receive, from base station 210, information associated with user device 205 (e.g., based on an RRC connection request message, as described above). For example, MME 215 can receive information associated with user device 205, such as a user device identifier, a mobile directory number (MDN), an international mobile subscriber identity (IMSI) number, an international mobile equipment identity (IMEI) number, a network address identifier, and/or the like.

In some implementations, MME 215 can determine, based on the attach request, a network slice to which user device 205 is to be granted access. In some implementations, a network can be associated with a plurality of network slices. Additionally, or alternatively, resources of the network (e.g., time resources, frequency resources, infrastructure resources, service resources, and/or the like) can be allocated to respective network slices. In some implementations, a network slice can also be referred to as a dedicated core network (DCN).

In some implementations, a network slice can be associated with a network slice identifier. For example, a first network slice (e.g., network slice 1) can be associated with a first network slice identifier (e.g., network slice identifier 1), a second network slice (e.g., network slice 2) can be associated with a second network slice identifier (e.g., network slice identifier 2), a third network slice (e.g., network slice 3) can be associated with a third network slice identifier (e.g., network slice identifier 3), etc. In some implementations, a network slice identifier can be assigned to a user device 205 for the purpose of identifying a network slice that the user device 205 is to access.

In some implementations, there can be a one-to-one mapping between network slice identifiers and network slices. For example, each network slice identifier can map to a single network slice, and each network slice can map to a single network slice identifier. In this case, every user device 205 associated with a particular network slice can be assigned the same network slice identifier.

In some implementations, different network slices of the network can be associated with different service requirements. For example, a first network slice (e.g., network slice 1) can be associated with a first service requirement, a second network slice (e.g., network slice 2) can be associated with a second service requirement, a third network slice (e.g., network slice 3) can be associated with a third service requirement, etc.

In some implementations, a service requirement associated with a network slice can indicate one or more network services supported by the network slice, one or more QoS parameters guaranteed by the network slice, one or more QCI classes supported by the network slice, a priority associated with traffic transmitted via the network slice (e.g., a QoS-based priority, a QCI-based priority, a priority relative to other service requirements of other network slices, and/or the like), one or more user device categories supported by the network slice, and/or the like. In some implementations, network traffic associated with a user device 205 assigned to a network slice identifier that is mapped to a particular network slice can receive treatment according to the service requirement of that particular network slice.

In this way, MME 215 can receive the attach request, and can identify information associated with user device 205 based on the attach request. Additionally, or alternatively, MME 215 can provide, to HSS 230 and using the information associated with user device 205, a request for information associated with a group identifier that is associated with user device 205, as described below. In this way, MME 215 can identify, using the group identifier, a network slice to which user device 205 is to be permitted access.

As further shown in FIG. 4, process 400 can include providing, to a home subscriber server and using the information associated with the user device, a request for information associated with a group identifier that is associated with the user device (block 420). For example, MME 215 can provide, to HSS 230, a request for information associated with a group identifier that is assigned to user device 205. In some implementations, MME 215 can provide, to HSS 230 via an S6A interface and using the information associated with user device 205, a request for information associated with a group identifier associated with user device 205.

In some implementations, a group identifier can be assigned to a plurality of user devices 205, and can be used to identify a network slice identifier and/or a network slice to which the plurality of user devices 205 is assigned. In some implementations, there can be a many-to-one mapping between group identifiers and network slice identifiers. For example, multiple group identifiers can map to a single network slice identifier, and a single network slice identifier can map to multiple group identifiers. In other words, tens, hundreds, thousands, etc. of group identifiers might map to a single network slice identifier. In practice, there can be thousands, millions, etc. of group identifiers.

In some implementations, a group identifier might not identify a particular network slice. Put another way, and as described elsewhere herein, mapping information can map a group identifier and a network slice identifier. The network slice identifier can directly identify the particular network slice, whereas the group identifier can be used to identify the network slice identifier.

In some implementations, a group identifier can be assigned to a particular user device 205 based on attributes of user device 205, such as an entity (e.g., a business, a company, an organization, a group of individuals, and/or the like) associated with user device 205, a characteristic associated with user device 205, a service requirement associated with user device 205, a type of user device 205, and/or the like. As examples, a set of user devices 205 associated with a particular entity might be associated with a first group identifier (e.g., Entity 1), another set of IoT user devices 205 can be associated with a second group identifier (e.g., IoT devices), and/or the like.

In some implementations, HSS 230 can store information associated with a subscriber profile based on configuration information, based on an instruction from another device, and/or the like. In some implementations, HSS 230 can identify a subscriber profile associated with user device 205 using the information associated with user device 205, and can identify a group identifier associated with user device 205 based on the subscriber profile. For example, HSS 230 can store, in association with a subscriber profile, information associated with a group identifier that is assigned to user device 205 associated with the subscriber profile.

In some implementations, the group identifier can remain static, whereas mapping information can be dynamically modified. In this way, HSS 230 might not be required to update subscriber profile information associated with user device 205 in the event that user device 205 is to be assigned to another network slice. For example, and as described elsewhere herein, mapping information can be dynamically modified to move user devices 205 between network slices. Thereby, some implementations described herein conserve processor and/or memory resources of HSS 230, and/or conserve network resources by reducing an amount of signaling associated with subscriber profile account modification.

In this way, MME 215 can provide, to HSS 230, the request for the information associated with the group identifier, and receive the information associated with the group identifier, as described below.

As further shown in FIG. 4, process 400 can include receiving, from the home subscriber server, information associated with the group identifier that is associated with the user device based on providing the request (block 430). For example, MME 215 can receive, from HSS 230 and via the S6A interface, the information associated with the group identifier of user device 205, and can determine, using the group identifier, a network slice identifier associated with user device 205, as described below.

As further shown in FIG. 4, process 400 can include determining a network slice identifier that is associated with the user device based on the information associated with the group identifier (block 440). For example, MME 215 can determine, using the group identifier, a network slice identifier associated with user device 205.

In some implementations, database server 240 can store mapping information that maps a group identifier and a network slice identifier. For example, database server 240 can store information that permits a group identifier to be resolved to a network slice identifier. In some implementations, database server 240 can store mapping information based on receiving the mapping information from another device, based on receiving configuration information, and/or the like.

In some implementations, a group identifier can remain static while mapping information can change. In this way, user devices 205 can be moved from one network slice to another network slice without requiring bulk HSS 230 updates, without requiring a significant amount of signaling traffic between MME 215 and HSS 230, and/or the like. Thereby, some implementations described herein conserve processor and/or memory resources of MME 215 and HSS 230, and/or conserve network resources.

In some implementations, MME 215 can provide, to database server 240, a request for information associated with a network slice identifier. For example, MME 215 can access database server 240 and perform a lookup using the group identifier. In this way, MME 215 can determine a particular network slice identifier that is associated with the group identifier of user device 205.

Thereby, MME 215 can determine the network slice identifier associated with user device 205, and permit user device 205 to access a network slice that is associated with the network slice identifier, as described below.

As further shown in FIG. 4, process 400 can include permitting the user device to access a network slice that is associated with the network slice identifier (block 450). For example, MME 215 can permit user device 205 to access a network slice, of the network, that is associated with the network slice identifier that is mapped to the group identifier.

In some implementations, MME 215 can provide an instruction to base station 210, and can permit user device 205 to access the network slice based on providing the instruction. For example, MME 215 can provide, to base station 210, an instruction that causes base station 210 to allocate network resources associated with the network slice to user device 205, to provide treatment to network traffic associated with user device 205 according to the service requirements of the network slice, and/or the like.

In this way, some implementations described herein permit user device 205 to be moved from one network slice to another network slice based on updated mapping information. In other words, information associated with a subscriber profile, of user device 205, can remain static, whereas the mapping information can be dynamically modified.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Implementations described herein permit the migration of user devices from one network slice to another network slice by replacing the network slice identifier in the HSS profile (described above) with a group identifier that is a symbolic representation of the network slice identifier, and enable the MME to resolve the group identifier to a network slice identifier.

Additionally, some implementations described herein permit a database server to store mapping information that maps a group identifier and a network slice identifier. In this way, the mapping information can be updated to permit user devices, associated with the group identifier, to be moved to another (either new or existing) network slice.

In this way, some implementations described herein enable a plurality of user devices to be moved from one network slice to another network slice without requiring the HSS to be modified for every user device of the plurality of user devices. Accordingly, some implementations described herein conserve HSS and/or MME processor and/or memory resources relative to using a static network slice identifier in the HSS. Furthermore, some implementations described herein conserve network resources by reducing a quantity of signaling traffic from the HSS to the MME associated with subscriber profile modification.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   providing, by a first device and to a second device, a request for group identification information associated with a user device;
   receiving, by the first device and from the second device, the group identification information based on providing the request for the group identification information;
   providing, by the first device and to a third device, a request for information associated with a network slice identifier associated with the group identification information; and
   permitting, by the first device, the user device to access a network slice using the information associated with the network slice identifier.

2. The method of claim 1, wherein permitting the user device to access the network slice comprises:
   providing, by the first device and to a base station, an instruction that causes the base station to allocate resources associated with the network slice to the user device.

3. The method of claim 1,
   wherein the first device is a mobility management entity device (MME), and
   wherein the third device is a database server.

4. The method of claim 1,
   wherein the first device is a mobility management entity device (MME), and
   wherein the second device is a home subscriber server (HSS).

5. The method of claim 1,
   wherein the group identification information comprises a group identifier, and
   wherein the group identifier is assigned to the user device based on attributes of the user device.

6. The method of claim 1, wherein the group identification information is received via an S6a interface.

7. The method of claim 1, wherein the network slice identifier is a static network slice identifier.

8. The method of claim 1, wherein the group identification information comprises a group identifier that is assigned to a plurality of user devices that include the user device.

9. A first device, comprising:
   one or more memories; and
   one or more processors communicatively coupled to the one or more memories, configured to:
      provide, to a second device, a request for group identification information associated with a user device;
      receive, from the second device, the group identification information based on providing the request for the group identification information;
      provide, to a third device, a request for information associated with a network slice identifier associated with the group identification information; and
      permit the user device to access a network slice using the information associated with the network slice identifier.

10. The first device of claim 9, wherein the one or more processors, when permitting the user device to access the network slice, are configured to:
    provide, by the first device and to a base station, an instruction that causes the base station to allocate resources associated with the network slice to the user device.

11. The first device of claim 9,
    wherein the first device is a mobility management entity device (MME), and
    wherein the third device is a database server.

12. The first device of claim 9,
    wherein the first device is a mobility management entity device (MME), and
    wherein the second device is a home subscriber server (HSS).

13. The first device of claim 9, wherein the group identification information is received via an S6a interface.

14. The first device of claim 9, wherein the network slice identifier is a static network slice identifier.

15. The first device of claim 9, wherein the group identification information comprises a group identifier that is assigned to a plurality of user devices that include the user device.

16. A non-transitory computer-readable medium storing instructions, the instructions comprising:
    one or more instructions that, when executed by one or more processors of a first device, cause the one or more processors to:
       provide, to a second device, a request for group identification information associated with a user device;
       receive, from the second device, the group identification information based on providing the request for the group identification information;
       provide, to a third device, a request for information associated with a network slice identifier associated with the group identification information; and
       permit the user device to access a network slice using the information associated with the network slice identifier.

17. The non-transitory computer-readable medium of claim 16, wherein the one or more instructions, that cause the one or more processors to permit the user device to access the network slice, cause the one or more processors to:
 provide, by the first device and to a base station, an instruction that causes the base station to allocate resources associated with the network slice to the user device.

18. The non-transitory computer-readable medium of claim 16,
 wherein the first device is a mobility management entity device (MME), and
 wherein the third device is a database server.

19. The non-transitory computer-readable medium of claim 16, wherein the network slice identifier is a static network slice identifier.

20. The non-transitory computer-readable medium of claim 16, wherein the group identification information comprises a group identifier that is assigned to a plurality of user devices that include the user device.

\* \* \* \* \*